(12) United States Patent
Sylvain et al.

(10) Patent No.: US 8,271,024 B1
(45) Date of Patent: Sep. 18, 2012

(54) MESSAGING SERVICE INTERWORKING

(75) Inventors: Dany Sylvain, Gatineau (CA); Michael Gawargy, Nepean (CA)

(73) Assignee: Genband US LLC, Plano, TX (US)

( * ) Notice: Subject to any disclaimer, the term of this patent is extended or adjusted under 35 U.S.C. 154(b) by 1371 days.

(21) Appl. No.: 10/723,835

(22) Filed: Nov. 26, 2003

(51) Int. Cl.
- H04L 12/58 (2006.01)
- H04W 4/00 (2009.01)
- H04W 36/00 (2009.01)
- H04M 1/00 (2006.01)

(52) U.S. Cl. ............... 455/552.1; 455/412.1; 455/435.2; 455/436

(58) Field of Classification Search .......... 455/445, 455/446, 422.1, 560, 426.1, 552.1, 553.1, 455/432.1, 550.1, 551, 435.2, 436; 370/216, 370/238, 351
See application file for complete search history.

(56) References Cited

U.S. PATENT DOCUMENTS

| | | | |
|---|---|---|---|
| 5,260,988 | A | 11/1993 | Schellinger et al. |
| 5,579,375 | A | 11/1996 | Ginter |
| 5,659,598 | A | 8/1997 | Byrne et al. |
| 5,722,068 | A | 2/1998 | Bartle et al. |
| 5,737,703 | A | 4/1998 | Byrne |
| 5,751,789 | A | 5/1998 | Farris et al. |
| 5,890,054 | A | 3/1999 | Logsdon et al. |
| 5,901,359 | A | 5/1999 | Malmstrom |
| 5,920,815 | A | 7/1999 | Akhavan |
| 5,940,756 | A * | 8/1999 | Sibecas et al. ............. 455/426.1 |
| 6,014,377 | A | 1/2000 | Gillespie |
| 6,052,597 | A * | 4/2000 | Ekstrom ................ 455/456.3 |
| 6,104,799 | A * | 8/2000 | Jain et al. ............... 379/211.01 |
| 6,154,650 | A | 11/2000 | Abidi et al. |
| 6,181,938 | B1 | 1/2001 | Salmela et al. |
| 6,233,465 | B1 | 5/2001 | Smith et al. |
| 6,243,581 | B1 | 6/2001 | Jawanda |
| 6,327,470 | B1 | 12/2001 | Ostling |
| 6,363,246 | B1 | 3/2002 | Williams et al. |
| 6,373,828 | B1 | 4/2002 | Stewart et al. |
| 6,411,802 | B1 | 6/2002 | Cardina et al. ............. 455/404 |
| 6,424,647 | B1 | 7/2002 | Ng et al. |
| 6,430,395 | B2 | 8/2002 | Arazi et al. |
| 6,438,384 | B1 | 8/2002 | Chen |
| 6,445,921 | B1 | 9/2002 | Bell |

(Continued)

FOREIGN PATENT DOCUMENTS

EP 1071295 A2 1/2001

(Continued)

OTHER PUBLICATIONS

A Report on the Status of Wireless access to 2-1-1, MAtch 2003, bu Stover and Cunningham pp. 8-10.*

(Continued)

*Primary Examiner* — Charles Appiah
*Assistant Examiner* — Joshua Schwartz
(74) *Attorney, Agent, or Firm* — Jenkins, Wilson, Taylor & Hunt, P.A.

(57) ABSTRACT

The present invention relates to facilitating the delivery of messaging service messages, such as those provided through short messaging services and multimedia messaging services, to a dual-mode terminal through a wireless network as well as through either a public switched telephone network (PSTN) or data access network using a terminal adaptor. The terminal adaptor is capable of providing local wireless communications with the dual-mode terminal, when it is within communication range of the terminal adaptor.

38 Claims, 11 Drawing Sheets

U.S. PATENT DOCUMENTS

| | | | |
|---|---|---|---|
| 6,633,636 B1 * | 10/2003 | McConnell et al. | 379/220.01 |
| 6,766,170 B1 | 7/2004 | Aretz et al. | |
| 6,791,988 B1 | 9/2004 | Hameleers et al. | |
| 6,912,389 B2 | 6/2005 | Bright et al. | |
| 6,940,844 B2 * | 9/2005 | Purkayastha et al. | 370/338 |
| 6,941,156 B2 | 9/2005 | Mooney | 455/553.1 |
| 6,985,720 B2 * | 1/2006 | Qu et al. | 455/412.1 |
| 6,987,988 B2 | 1/2006 | Uchiyama | 455/557 |
| 7,043,248 B2 * | 5/2006 | Hallenstal et al. | 455/445 |
| 7,058,415 B2 * | 6/2006 | Bushnell et al. | 455/461 |
| 7,136,375 B1 | 11/2006 | Koistinen | |
| 7,522,632 B2 * | 4/2009 | La Porta et al. | 370/466 |
| 7,844,270 B2 | 11/2010 | Sylvain | |
| 2002/0024947 A1 * | 2/2002 | Luzzatti et al. | 370/352 |
| 2002/0061744 A1 | 5/2002 | Hamalainene et al. | |
| 2002/0085516 A1 * | 7/2002 | Bridgelall | 370/329 |
| 2002/0106028 A1 | 8/2002 | Thyssen | |
| 2002/0110112 A1 | 8/2002 | Tuomi | |
| 2002/0147008 A1 * | 10/2002 | Kallio | 455/426 |
| 2002/0196770 A1 | 12/2002 | Lin | |
| 2003/0008682 A1 | 1/2003 | Emerson, III | |
| 2003/0134638 A1 | 7/2003 | Sundar et al. | |
| 2003/0134650 A1 | 7/2003 | Sundar et al. | |
| 2003/0214940 A1 | 11/2003 | Takken | |
| 2003/0224795 A1 * | 12/2003 | Wilhoite et al. | 455/445 |
| 2004/0072593 A1 | 4/2004 | Robbins et al. | |
| 2004/0132485 A1 | 7/2004 | Charney et al. | |
| 2004/0160932 A1 | 8/2004 | Yegoshin | |
| 2004/0202940 A1 * | 10/2004 | Kramer et al. | 429/306 |
| 2004/0203606 A1 * | 10/2004 | Souissi et al. | 455/412.1 |
| 2004/0203680 A1 | 10/2004 | Sylvain | |
| 2004/0235482 A1 | 11/2004 | Sylvain | |
| 2004/0266398 A1 | 12/2004 | Adamczyk et al. | |
| 2005/0003857 A1 | 1/2005 | Sylvain | |
| 2005/0148353 A1 * | 7/2005 | Hicks et al. | 455/466 |
| 2005/0159153 A1 * | 7/2005 | Mousseau et al. | 455/432.1 |
| 2007/0189489 A1 | 8/2007 | Carnazza et al. | |

FOREIGN PATENT DOCUMENTS

| | | |
|---|---|---|
| EP | 1223781 A2 | 7/2002 |
| WO | 00/79813 A1 | 12/2000 |
| WO | 02/19750 A1 | 3/2002 |
| WO | 03/019884 A1 | 3/2003 |

OTHER PUBLICATIONS

Adachi et al, "A Handoff Examination of a Hybrid System Using Cellular and Ad-Hoc Modes," IEICE Transactions on Communications, Institute of Electronics Information and Communications Enginerring, Tokyo, Japan, Nov. 2000, vol. E83-B, No. 11, pp. 2494-2500, XP001065366.

International Search Report for PCT/IB2004/001668 mailed Jul. 5, 2005.

International Search Report for PCT/IB2004/001672 mailed Jan. 27, 2005.

European search report for application No. 07012474.8, completed Sep. 28, 2007.

Strover et al., "A Report on the Status of Wireless Access to 2-1-1," Telecommunications and Information Policy Institute University of Texas at Austin, pp. 8-10 (Mar. 2003).

* cited by examiner

MESSAGING SERVICE INTERWORKING

FIELD OF THE INVENTION

The present invention relates to mobile communications, and in particular to allowing a single mobile terminal to communicate using a messaging service over wireless networks as well as the public switched telephone network or data networks via a wireless interface.

BACKGROUND OF THE INVENTION

Today's telephony users generally have at least one wireline-based telephone terminal receiving services through the public switched telephone network (PSTN) and a mobile terminal receiving services through a cellular network. These wireline and mobile terminals are incompatible, and thus incapable of facilitating communications over both cellular and public switched networks. As such, telephony users must juggle multiple telephone terminals, using one terminal to make and receive calls via the cellular network, and another to make and receive calls via the PSTN. In addition to the user having to keep track of multiple terminals, incoming calls are generally free through the service providers of the PSTN, while cellular service providers charge for such incoming calls.

To address these issues, communication technology is advancing to a point where specially configured mobile terminals can communicate via a cellular-based wireless network, as well as the PSTN or a data access network through a terminal adaptor. For clarity, the mobile terminal, which is capable of operating in both modes, is referred to as a dual-mode terminal. The terminal adaptor may be coupled to the PSTN or data access network and communicates wirelessly with the dual-mode terminal using local wireless access technology, such as traditional analog and digital cordless technologies, 802.11 wireless local area network technologies, and Bluetooth technology. Notably, the dual-mode terminal may be permanently or temporarily associated with one address, such as a directory number, for cellular access, and another for PSTN or data access.

Through one of the connections to the PSTN or data access network, the terminal adaptor may have a data interface through which it can communicate with a service node, which may control the routing of incoming calls directed to the mobile terminal through the wireless network, PSTN, or data access network. The terminal adaptor may determine when the dual-mode terminal is within a zone in which communication via the local wireless access technology is possible, and provide information to the service node bearing on whether the mobile terminal is within or outside of the zone. In other embodiments, the dual-mode terminal may determine when communications with the terminal adaptor are possible and provide alerts through the wireless network or via the terminal adaptor. For example, the service node may take this information and direct incoming calls to the PSTN directory number associated with the terminal adaptor when the mobile terminal is within the zone, and direct calls to the directory number associated with the wireless network when the mobile terminal is outside of the zone.

For additional information on dual-mode terminals and related communication systems, attention is directed to co-assigned U.S. patent application Ser. No. 10/409,280, entitled INTEGRATED WIRELINE AND WIRELESS SERVICE, filed Apr. 8, 2003; Ser. No. 10/409,290, entitled CALL TRANSFER FOR AN INTEGRATED WIRELINE AND WIRELESS SERVICE, filed Apr. 8, 2003; Ser. No. 10/626,677, entitled INTEGRATED WIRELINE AND WIRELESS SERVICE USING A COMMON DIRECTORY NUMBER, filed Jul. 24, 2003; Ser. No. 60/472,277, entitled WLAN CALL HANDOFF TO WIRELESS USING DYNAMICALLY ASSIGNED TEMPORARY NUMBER, filed May 21, 2003; Ser. No. 60/472,152, entitled HANDOFF FROM CELLULAR NETWORK TO WLAN NETWORK, filed May 21, 2003; Ser. No. 10/693,540, entitled CALL TRANSFER FOR AN INTEGRATED WIRELINE AND WIRELESS SERVICE USING A TEMPORARY DIRECTORY NUMBER, filed Oct. 24, 2003; and Ser. No. 10/693,539, entitled CALL TRANSFER FOR AN INTEGRATED WIRELINE AND WIRELESS SERVICE USING A TEMPORARY DIRECTORY NUMBER, filed Oct. 24, 2003.

Communication systems supporting the above described dual-mode capability have yet to accommodate short message service (SMS) and multimedia message service (MMS) technologies where short text or multimedia files are delivered between mobile terminals. In a dual-mode system as described above, there is no way for the SMS or MMS messages to be sent from or delivered to the dual-mode terminal when it is being supported solely by the terminal adaptor. The SMS or MMS messaging is only supported when the wireless network supports the dual-mode terminal. As such, there is a need for a technique for fully supporting SMS and MMS messaging for dual-mode terminals, regardless of whether the dual-mode terminal is supported by the terminal adaptor or the wireless network.

SUMMARY OF THE INVENTION

The present invention relates to facilitating the delivery of messaging service messages, such as those provided through short messaging services and multimedia messaging services, to a dual-mode terminal through a wireless network as well as through either a public switched telephone network (PSTN) or data access network using an appropriately configured terminal adaptor. The terminal adaptor is capable of providing local wireless communications with the dual-mode terminal, when it is within communication range of the terminal adaptor.

In one embodiment, the wireless network is a cellular-based wireless network capable of forwarding messaging service messages in traditional fashion. When the dual-mode terminal is supported by the terminal adaptor, messaging service messages may be sent from or received by the dual-mode terminal via the terminal adaptor, which will cooperate with a service node. The service node will determine how to route the incoming or outgoing messaging service messages and provide any protocol or format conversions necessary for proper delivery of the messaging service messages. Messages intended for the dual-mode terminal may be delivered via the terminal adaptor or via the wireless network, depending on whether the terminal adaptor is within the communication range of the dual-mode terminal or based on the desire of the operator. With the present invention, the messaging service messages may be delivered to the dual-mode terminal in a traditional fashion through the wireless network or via a terminal adaptor, in an effective and efficient manner.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a communication environment according to one embodiment of the present invention.

FIG. 2 provides a communication call flow diagram for receiving a message from a cellular network at a dual-mode terminal supported by a local wireless system according to one embodiment of the present invention.

FIG. 3 provides a communication call flow diagram for receiving a message from a cellular network at a dual-mode terminal supported by another cellular network according to one embodiment of the present invention.

FIG. 4 provides a communication call flow diagram for sending a message from a dual-mode terminal supported by a local wireless system to a cellular network according to one embodiment of the present invention.

FIG. 5 provides a communication call flow diagram for sending a message from a dual-mode terminal supported by a cellular network according to one embodiment of the present invention.

FIG. 6 provides a communication call flow diagram for sending a message from a dual-mode terminal supported by a cellular network according to one embodiment of the present invention.

FIG. 7 provides a communication call flow diagram for receiving a message from a cellular network at a dual-mode terminal supported by another cellular network according to one embodiment of the present invention.

FIG. 8 provides a communication call flow diagram for receiving a message from a cellular network at a dual-mode terminal supported by a local wireless system according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
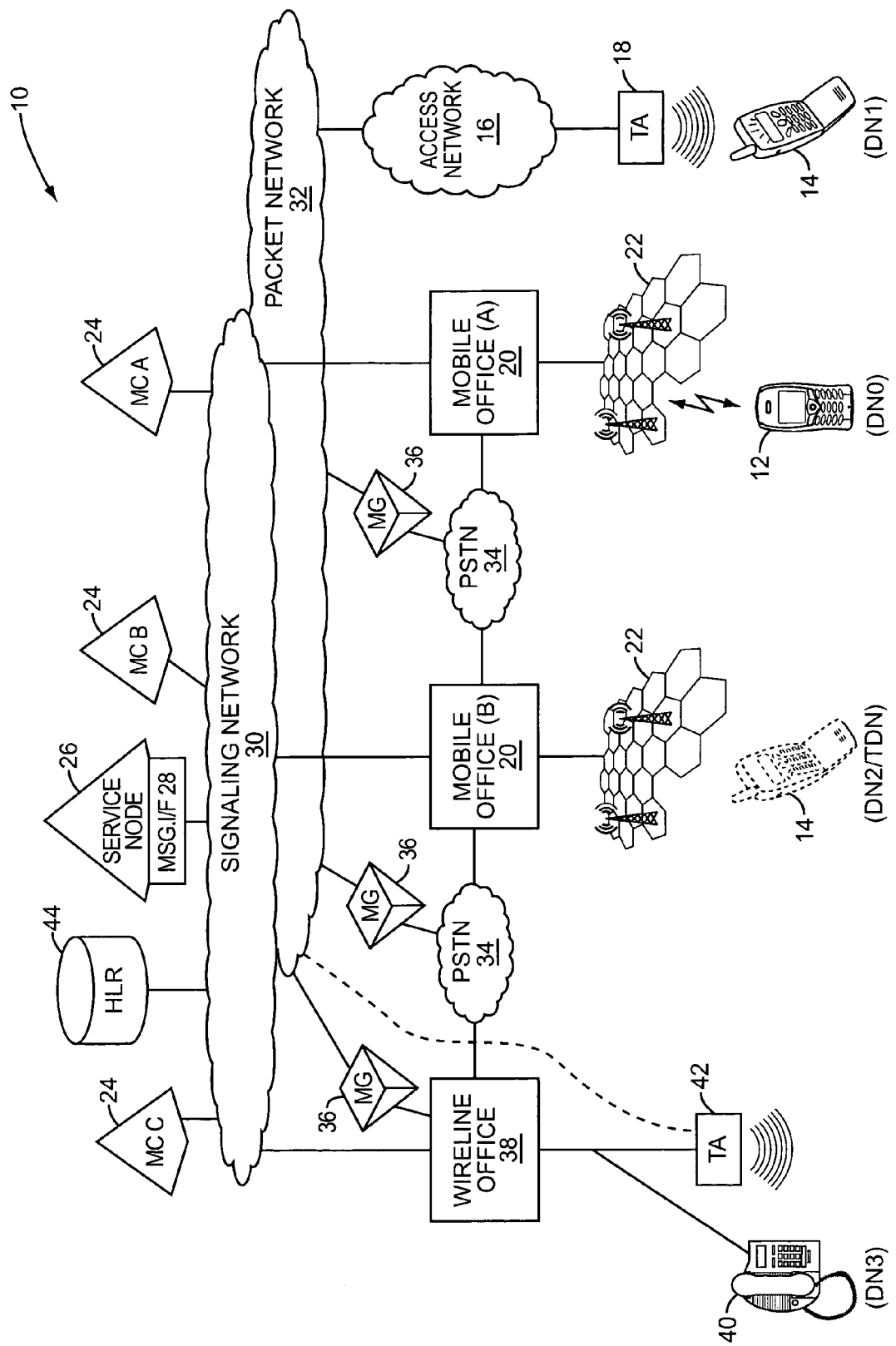

With reference to FIG. 1, a communication environment 10 according to select embodiments of the present invention is shown. The communication environment 10 supports both telephony services as well as various messaging services between one or more mobile terminals 12 and a dual-mode terminal 14, which is a mobile terminal configured to communicate via a traditional wireless network, generally a cellular-type network, as well as via a local wireless network, such as can be implemented through any number of local wireless technologies, such as wireless local area networks (WLAN) or any other local analog or digital techniques. Communications not facilitated by the wireless network may be facilitated through a data access network 16 using an appropriately configured terminal adaptor 18 when the dual-mode terminal 14 is within the limited communication range of the terminal adaptor 18.

When the dual-mode terminal 14 is outside of the communication range of the terminal adaptor 18, or when cellular-type communications are desired, cellular communications may be facilitated directly with a servicing mobile office 20 via a supporting network of base stations 22. The mobile office 20 may be a traditional mobile switching center capable of supporting any type of cellular base technology, such as TDMA, CDMA, UMTS, OFDM, and GSM. In addition to these traditional cellular techniques, packet-based communications between the mobile office 20 and the dual-mode terminal 14 and the other mobile terminals 12 may be supported.

To facilitate messaging services between the various mobile terminals 12 and the dual-mode terminal 14, the communication environment 10 will include one or more messaging centers (MCs) 24, which may take the form of a short message service center (SMSC) capable of cooperating with the various mobile offices 20 to facilitate the delivery of short message service (SMS) messages or multimedia message service (MMS) messages between the mobile terminals 12 and the dual-mode terminal 14. The present invention incorporates a service node 26 to facilitate the extension of message services to the dual-mode terminal 14 via the terminal adaptor 18, such that the message services are not only made available via the wireless network in traditional fashion. The service node 26 will include a messaging interface (MSG.I/F) 28, which appears as a messaging center 24 to other messaging centers 24 and other entities in the communication environment 10 which participate in the messaging service.

The communication environment 10 will also include a signaling network 30 through which traditional call signaling and routing of messaging service messages are facilitated, as well as a packet network 32, which may be used to carry data as well as voice information depending on the configuration and interaction with the other telephony entities. Generally, the mobile offices 20 directly or indirectly connect to the public switched telephone network (PSTN) 34, which may interwork with the packet network 32 via any number of media gateways 36. As such, voice information may be communicated from one endpoint to another through the PSTN 34 as well as the packet network 32 with the assistance of the media gateways 36.

The communication environment 10 also includes various wireline offices 38, which couple to the PSTN 34 and may couple to the packet network 32 directly or indirectly through one of the media gateways 36. Those skilled in the art will recognize that the wireline office 38 may be a telephony switch based on either time division multiplex (TDM) or packet technology. The wireline office 38 may also take the form of a TDM or packet-based private branch exchange (PBX). The wireline office 38 will generally provide a direct connection to one or more wireline terminals 40 over a telephony subscriber line, such as a traditional plain old telephone system (POTS) line, a digital subscriber loop, or an integrated services digital network (ISDN). To allow the dual-mode terminal 14 to communicate via the wireline office 38, a terminal adaptor 42 may be implemented to provide a local wireless interface with the dual-mode terminal 14 and a more traditional telephony interface with the wireline office 38. As such, communications with the dual-mode terminal 14 can be established via the wireline office 38. Additional information on the integration of wireline and wireless services may be found in co-assigned U.S. application Ser. No. 10/409,280, entitled INTEGRATED WIRELINE AND WIRELESS SER- VICE, filed Apr. 8, 2003, which is incorporated herein by reference. Also provided in the communication environment 10 is a home location register (HLR) 44, which is normally associated with the wireline network, the functionality of which is described in greater detail below.

In general, the terminal adaptors 18 and 42 interface with either a data access network 16 or a telephony line associated with the wireline office 38, as well as facilitate local wireless communications with the dual-mode terminal 14. Accordingly, for an incoming or outgoing call via either the telephony line or the data access network 16, the terminal adaptor 18 (or 42) will provide a circuit-switched interface to the telephony line or packet-based session over the data access network 16, as well as a wireless interface to the dual-mode terminal 14, wherein the dual-mode terminal 14 operates analogously to a traditional cordless residential telephone in relation to the terminal adaptor 42 or as a portable IP phone in relation to terminal adaptor 18. The terminal adaptor 18 (or 42) may be capable of supporting multiple dual-mode terminals 14.

The wireless interface provided by the terminal adaptor 18 (or 42) will have a limited communication range, and as such, will provide a terminal adaptor zone, which defines an area or range in which communications between the terminal adaptor 18 (or 42) and the dual-mode terminal 14 are possible. Either the dual-mode terminal 14 or the terminal adaptor 18 (or 42), through a variety of possible techniques, will determine whether communications between the terminal adaptor 18 (or 42) and the dual-mode terminal 14 are possible. In other words, the terminal adaptor 18 (or 42) may determine whether the dual-mode terminal 14 is within the terminal adaptor zone, and provide information bearing on this relative presence through the data access network 16, over the telephony line, or via the wireless network to an appropriate entity in the communication environment 10, such as the service node 26. Although not directly illustrated, the terminal adaptor 18 (or 42) may have both data access network connections and telephony line connections available at the same time. The terminal adaptor 18 (or 42) will generally connect to the data access network 16 through appropriate customer premise equipment (not shown) which may take the form of a cable modem, DSL modem, ISDN modem, or like communication terminal that provides access to the data access network 16 via the corresponding cable network, DSL network, or ISDN network forming the data access network 16. In essence, the terminal adaptor 18 (or 42) provides a liaison between the dual-mode terminal 14 and the PSTN 34 or packet network 32. Notably, both the packet network 32 and the signaling network 30 are either coupled to each other or coupled to the service node 26.

The service node 26 is configured to interact directly or indirectly with the terminal adaptor 18 (or 42), the wireline office 38, the mobile offices 20, and one or more of the messaging centers 24 to assist in routing messaging service messages, and perhaps facilitate the routing of incoming or outgoing calls involving the dual-mode terminal 14. In one embodiment, communications with the service node 26 are implemented using the session initiation protocol (SIP), especially for those communications with the terminal adaptor 18 (or 42). Communications with the messaging centers 24 are preferably implemented via the messaging interface 28 of the service node 26, and will use the existing messaging service protocol such that the service node 26 may appear as a messaging center 24 or as a messaging-aware application server without requiring significant reconfiguration of the messaging service entities. Those skilled in the art will recognize other applicable and alternative signaling technologies and protocols. As noted, the present invention allows the dual-mode terminal 14 to send and receive messaging service messages via the wireless network as well as via the terminal adaptor 18 (or 42).

Figure 2:
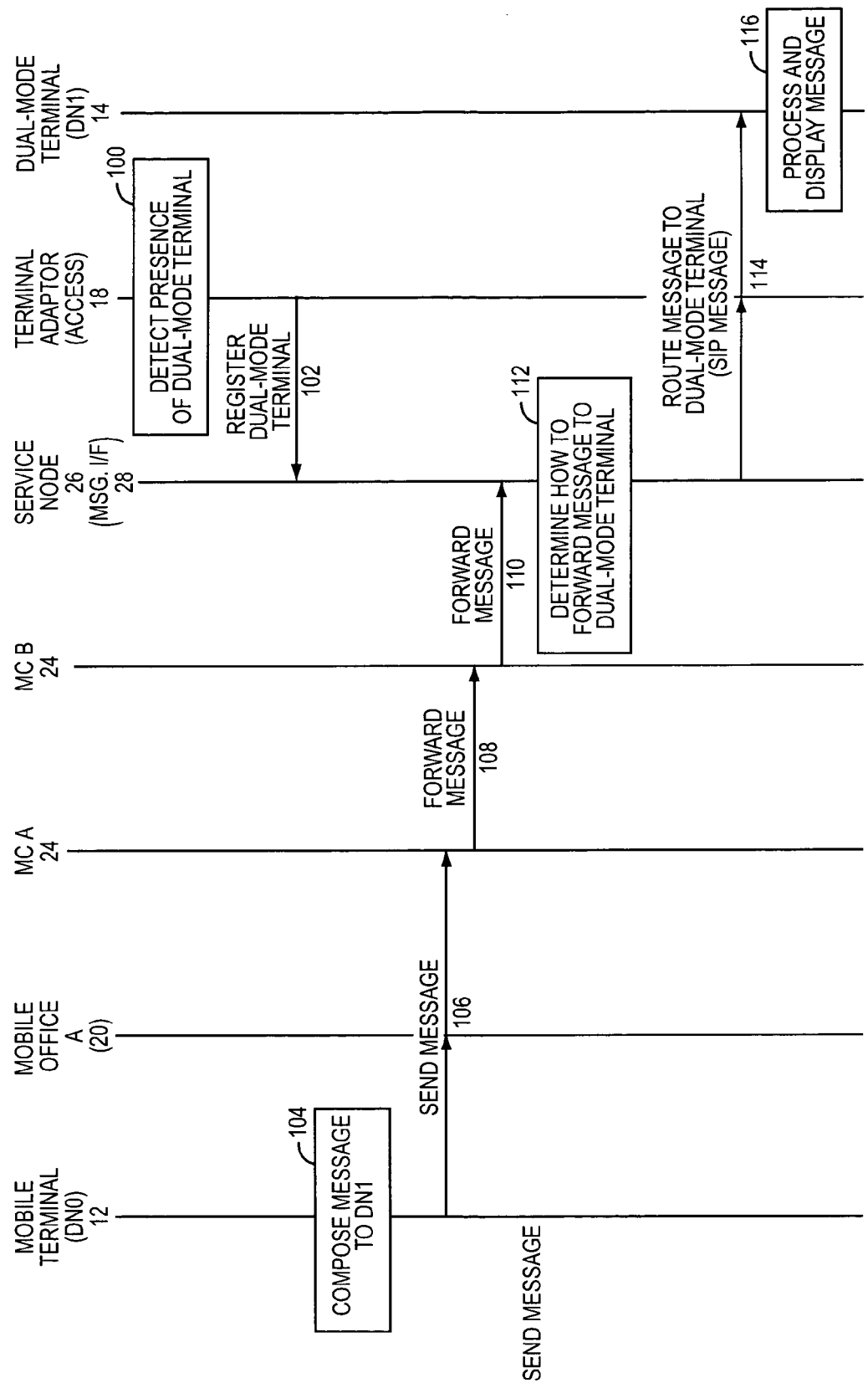

The communication flow diagrams of FIGS. 2-8 illustrate various messaging scenarios according to various embodiments of the present invention. These illustrations are exemplary in nature and are not intended to limit the scope of the concept of the present invention. Further, the messaging service message may be carried from one messaging service entity to another using a messaging service protocol in traditional fashion, or may be carried over another protocol for transport to non-messaging service entities such as the terminal adaptor 18 (or 42). With particular reference to FIG. 2, assume that a messaging service message is sent from mobile terminal 12, which is supported by mobile office 20(A) to the dual-mode terminal 14 currently served via the terminal adaptor 18. Initially, the terminal adaptor 18 will detect the presence of the dual-mode terminal 14 within the terminal adaptor zone (step 100) and send a messaging service message to the service node 26 to register the dual-mode terminal 14 as being supported by the terminal adaptor 18 (step 102). Alternatively, the dual-mode terminal 14 may detect an ability to communicate with the terminal adaptor 18 and direct a message towards the service node 26 via the wireless network to indicate that the terminal adaptor 18 can communicate with the dual-mode terminal 14. In another embodiment, the dual-mode terminal 14 may instruct the terminal adaptor 18 to send the registration message to the service node 26. Those skilled in the art will recognize numerous techniques where the dual-mode terminal 14 or the terminal adaptor 18 will individually or cooperatively alert the service node 26 of the ability of the dual-mode terminal 14 and the terminal adaptor 18 to communicate with one another.

After the dual-mode terminal 14 is registered in association with the terminal adaptor 18 at the service node 26, assume that mobile terminal 12 composes or otherwise creates a messaging service message intended for the dual-mode terminal 14 by addressing the messaging service message to directory number DN1, which may be the master directory number associated with the dual mode terminal 14 (step 104). The mobile terminal 12 will send the messaging service message toward mobile office 20(A), which will forward it to messaging center 24(A), which is associated with mobile office 20(A) (step 106). Messaging center 24(A) will forward the messaging service message to messaging center 24(B) (step 108), which will forward the messaging service message to the messaging interface 28 of the service node 26 (step 110). In this scenario, messaging centers 24(A) and 24(B) will associate directory number DN1 as being supported by the messaging interface 28, which appears to messaging centers 24(A) and 24(B) as the messaging center supporting DN1.

Once the messaging service message is received at the service node 26, a determination is made as to how to forward the messaging service message to the dual-mode terminal 14 (step 112). Since the dual-mode terminal 14 may be supported via the wireless network or the terminal adaptor 18, the relative registration of the dual-mode terminal 14 will dictate how the messaging service message is routed. In this instance, the service node 26 recognizes the dual-mode terminal 14 as being registered with the terminal adaptor 18 and will then take the necessary steps to route the messaging service message to the dual-mode terminal 14 via the terminal adaptor 18 (step 114), preferably using the session initiation protocol (SIP), and a SIP MESSAGE message. Once the messaging service message is received by the dual-mode terminal 14, it is processed and displayed or otherwise provided to the user as if it were received via traditional messaging service techniques (step 116). As such, the dual-mode terminal 14 will be configured such that the local wireless interface applications will cooperate with the messaging service applications to allow the message to be displayed as a messaging service message.

Figure 3:
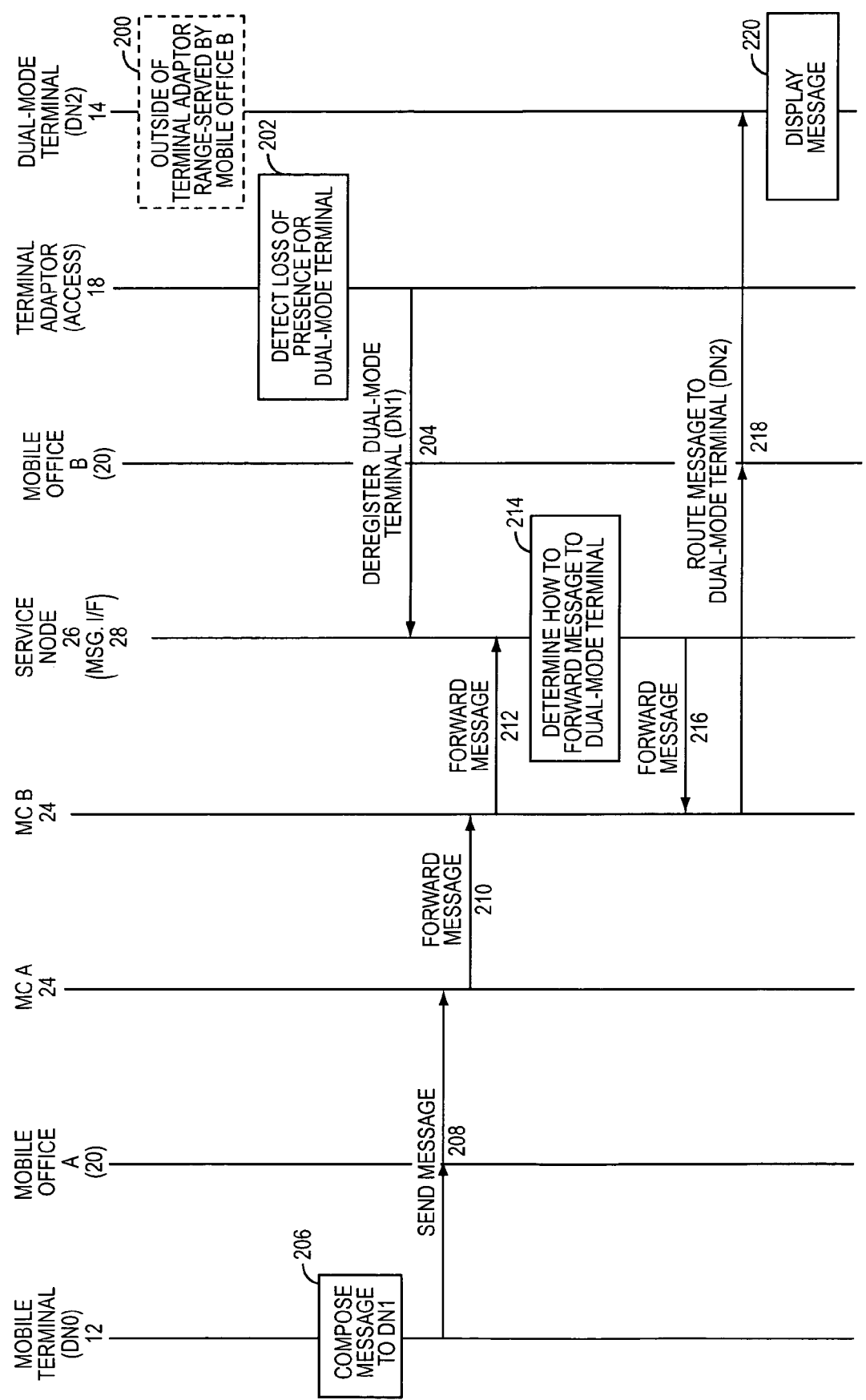

With reference to FIG. 3, assume the mobile terminal 12 composes a message intended for the dual-mode terminal 14 using directory number DN1, but the dual-mode terminal 14 is not registered as being associated with the terminal adaptor 18. Instead, the dual-mode terminal 14 is receiving service via the wireless network. Accordingly, the dual-mode terminal 14 may be outside the terminal adaptor's communication range or for some reason may be directed to be serviced by the wireless network, and in particular, via mobile office 20(B) (step 200). Once the dual-mode terminal 14 moves outside of the terminal adaptor zone, the terminal adaptor 18 may detect a loss of presence for the dual-mode terminal 14 (step 202), and send a message to the service node 26 to deregister the dual-mode terminal 14 as being associated with the terminal adaptor 18 (step 204). As noted above, the dual-mode terminal 14 may communicate with the service node 26 to effectively deregister the dual-mode terminal 14 as being associated with the terminal adaptor 18 or directly register the dual-mode terminal 14 as being serviced through the wireless network with the service node 26.

Again, the mobile terminal 12 will compose a messaging service message intended for or addressed to directory number DN1 (step 206) and the messaging service message is sent through mobile office 20(A) to messaging center 24(A) (step 208). The messaging service message is again forwarded to messaging center 24(B) (step 210), which forwards the messaging service message to the service node 26 via the messaging interface 28 (step 212). The service node 26 will then determine how to forward the messaging service message to the dual-mode terminal 14 (step 214). In this case, the dual-mode terminal 14 is being supported or is otherwise registered with the wireless network, and as such, service node 26 will take the necessary steps to forward the messaging service message to the dual-mode terminal 14 via the wireless network. Notably, the dual-mode terminal 14 may be associated with different directory numbers wherein one directory number is used for accessing the dual-mode terminal 14 when it is being serviced via the terminal adaptor 18 and another directory number when the dual-mode terminal 14 is being serviced by the wireless network. In this embodiment, the directory number DN1 is managed by the service node 26; however, calls and messages directed to the dual-mode terminal 14 through the wireless network need to be directed to directory number DN2. The service node 26 will be aware of this, and will forward the messaging service message toward directory number DN2, which is associated with the dual-mode terminal 14. Assume that the dual-mode terminal 14 is being serviced by mobile office 20(B), which is associated with messaging center 24(B). As such, the service node 26 will send the messaging service message directly or indirectly to messaging center 24(B) (step 216), which will route the messaging service message using directory number DN2 to the dual-mode terminal 14 via mobile office 20(B) (step 218). Upon receipt of the messaging service message, the dual-mode terminal 14 will display the messaging service message in traditional fashion (step 220).

Figure 4:
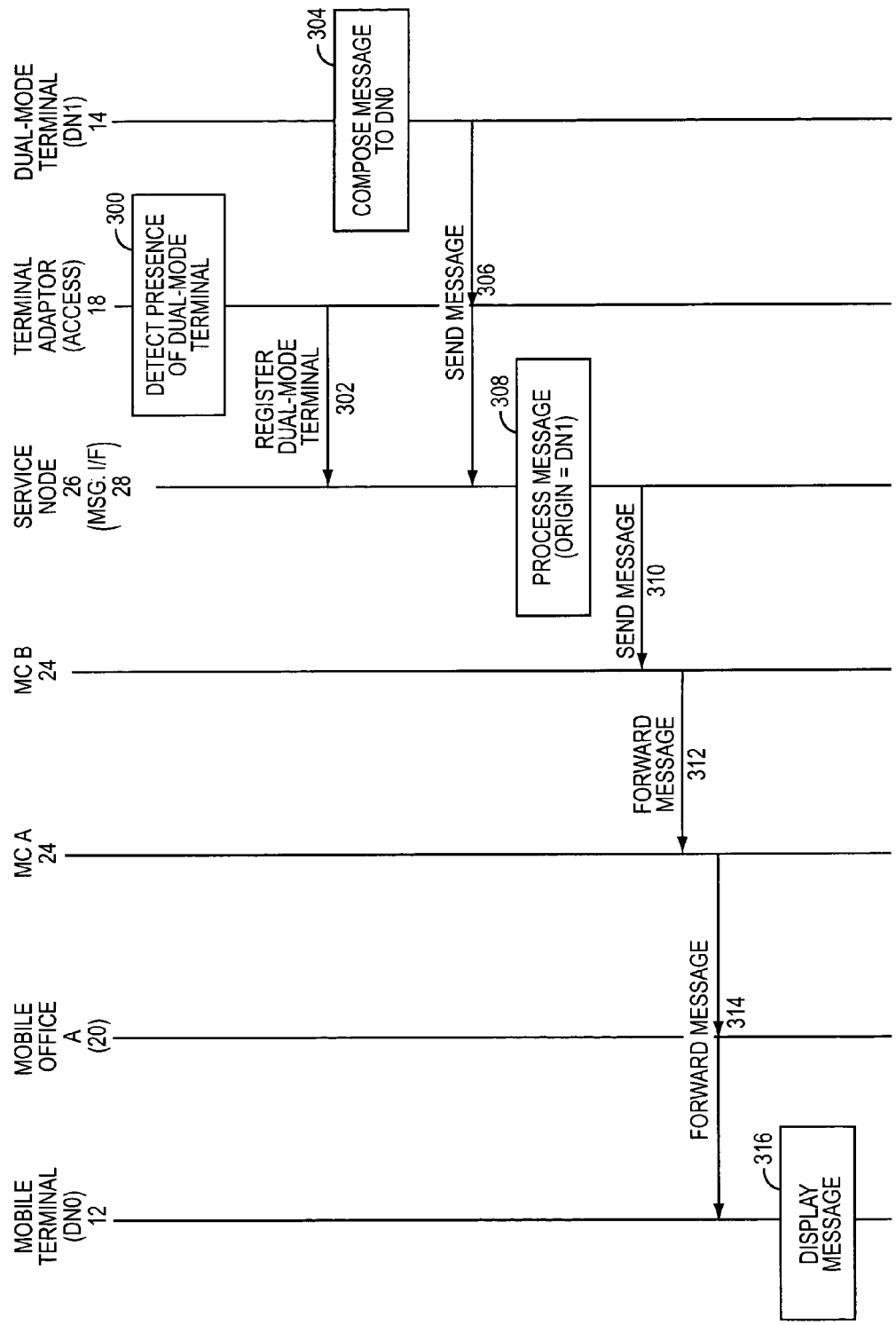

Turning now to FIG. 4, assume the dual-mode terminal 14 is being supported by the terminal adaptor 18 and sends a messaging service message to mobile terminal 12, which is being serviced by mobile office 20(A). Initially, assume that the terminal adaptor 18 detects the presence of the dual-mode terminal 14 (step 300) and registers the dual-mode terminal 14 with the service node 26 as being supported by the terminal adaptor 18 (step 302). Once registered in association with the terminal adaptor 18, the dual-mode terminal 14 will compose a messaging service message intended for directory number DN0 (step 304) and send the messaging service message to the service node 26 via the terminal adaptor 18 (step 306). Assume that the dual-mode terminal 14 is associated with directory number DN1 when supported by the terminal adaptor 18 and that the messaging service message sent to the service node 26 includes directory number DN1 as the originating directory number. Also assume that the messaging service message was sent using a SIP MESSAGE message to the service node 26.

The service node 26 will then process the message and create a properly formatted messaging service message for delivery to the mobile terminal 12 (step 308). As such, the service node 26 will then send the messaging service message via the messaging interface 28 toward the mobile terminal 12 wherein the messaging service message is originally sent to messaging center 24(B) (step 310), which forwards the messaging service message to messaging center 24(A) (step 312), which supports mobile office 20(A). Thus, messaging center 24(A) will forward the messaging service message to the mobile terminal 12 via mobile office 20(A) (step 314) wherein the mobile terminal 12 will display the messaging service message in traditional fashion (step 316).

Figure 5:
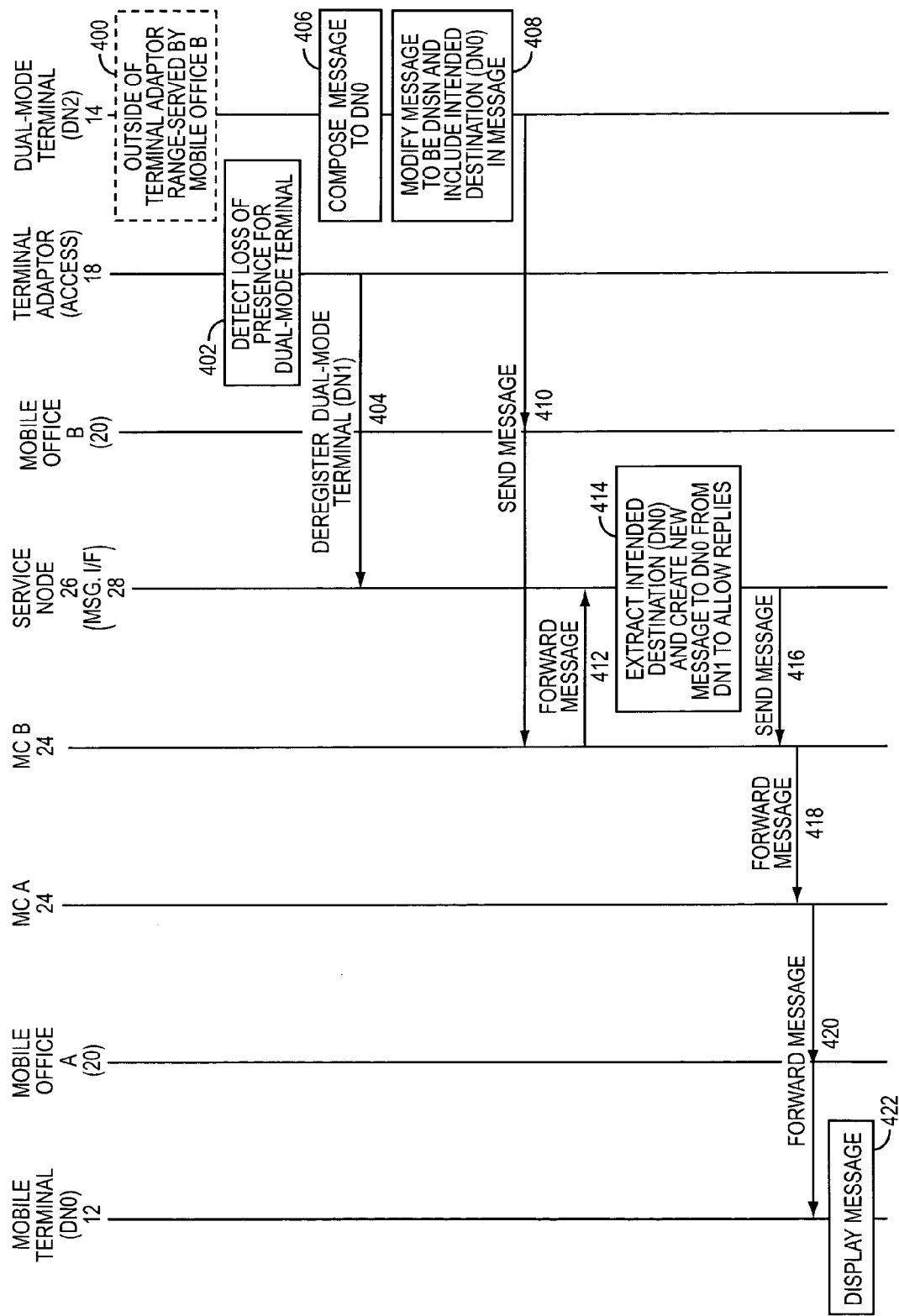

In FIG. 5, assume the dual-mode terminal 14 sends a messaging service message to the mobile terminal 12 using directory number DN0 and that the dual-mode terminal 14 is being serviced through the wireless network and not via the terminal adaptor 18. Thus, at some point, the dual-mode terminal 14 will move outside of the terminal adaptor range or will be otherwise instructed to communicate via the wireless network (step 400). Assume the dual-mode terminal 14, when serviced by the wireless networks associated with directory number DN2, is being serviced by mobile office 20(B). The terminal adaptor 18 will detect the loss of presence for the dual-mode terminal 14 (step 402) and will send a message to the service node 26 to deregister the dual-mode terminal 14 in association with the terminal adaptor 18 (step 404). Again, other techniques may be used to alert the service node 26 that the dual-mode terminal 14 is being serviced through the wireless network.

When the dual-mode terminal 14 composes a messaging service message intended for directory number DN0 (step 406), the dual-mode terminal 14 will preferably modify the destination address to be a directory number associated with the messaging interface 28 of the service node 26. Assume the directory number for the messaging interface 28 is DNSN, and also assume that the originally intended destination, directory number DN0, is provided somewhere in the messaging service message (step 408). Once modified, the messaging service message is sent toward messaging interface 28, which is associated with directory number DNSN. Initially, the messaging service message is sent to messaging center 24(B) via mobile office 20(B) because messaging center 24(B) is associated with mobile office 20(B) (step 410). Messaging center 24(B) will then forward the message directly or indirectly to the messaging interface 28, which appears as a messaging center to which messaging service messages are sent when directed to directory number DNSN (step 412). The service node 26 will then extract the intended destination, directory number DN0, and create a new messaging service message with the destination address of directory number DN0 and the origination address of directory number DN1. As such, potential replies from DN0 to the messaging service message are directed to the master directory number DN1 served by the service node 26 instead of to directory number DN2, which is only supported by the wireless network (step 414). If directory number DN2 is used for replies, the dual-mode terminal 14 would not be able to receive its messaging service messages when it is only serviced by the terminal adaptor 18.

At this point, the new messaging service message is sent toward directory number DN0, and in particular, sent to messaging center 24(B) (step 416), which forwards the messaging service message to messaging center 24(A) (step 418), which forwards the messaging service message to the mobile terminal 12 via mobile office 20(A) (step 420). The mobile terminal 12 will then display the messaging service message in traditional fashion (step 422), and any replies will be directed to directory number DN1, which will be handled by the service node 26 via the messaging interface 28. Thus, the replies will be sent to the dual-mode terminal 14 through either the terminal adaptor 18 or the wireless network.

Figure 6:
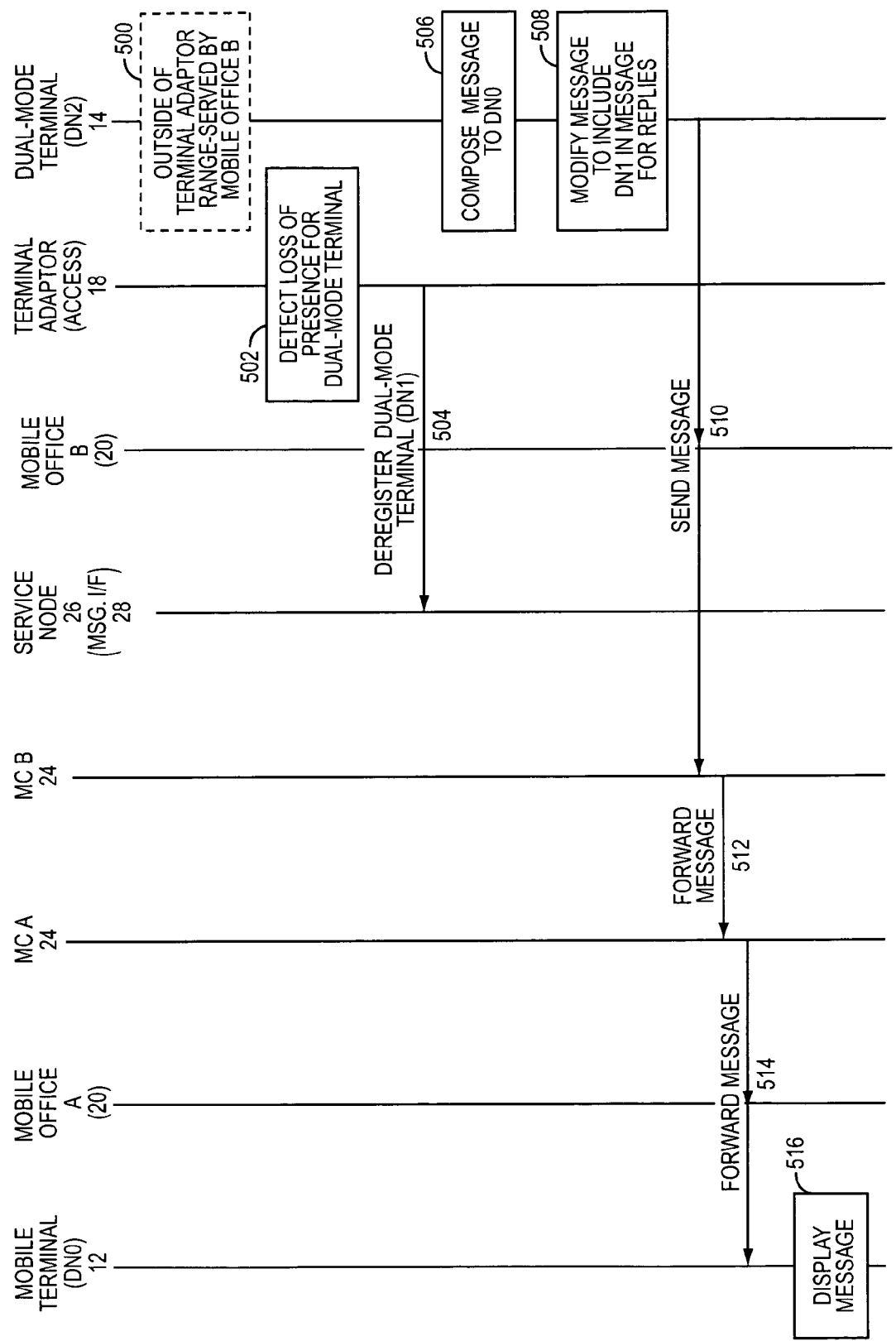

FIG. 6 illustrates an alternative technique for sending messaging service messages from the dual-mode terminal 14 to the mobile terminal 12 when the dual-mode terminal 14 is supported by the wireless network. Again, assume the dual-mode terminal 14 is outside of the terminal adaptor range, or directed to operate via the wireless network (step 500). The terminal adaptor 18 may detect loss of presence of the dual-mode terminal 14 (step 502) and send a message to the service node 26 to deregister the dual-mode terminal 14 as being associated with the terminal adaptor 18 (step 504). When the dual-mode terminal 14 composes a messaging service message intended for directory number DN0 (step 506), the message can be modified to include directory number DN1 somewhere in the body of the message such that the user of mobile terminal 12 will know where to send replies, and thus not use directory number DN2. However, this will require that the recipient essentially create a new messaging service message or change the destination for the reply message to include directory number DN1. At this point, the dual-mode terminal 14 can send the messaging service message toward the mobile terminal 12, and in particular, the message is sent to messaging center 24(B) via mobile office 20(B) (step 510). Messaging center 24(B) will forward the messaging service message to messaging center 24(A) (step 512), which will forward the messaging service message to the mobile terminal 12 via mobile office 20(A) (step 514). The mobile terminal 12 will then display the messaging service message in traditional fashion (step 516). As noted, the messaging service message will include the directory number DN1 to use for replies, but will require the recipient to take additional steps to avoid the messaging service message from being automatically sent toward directory number DN2, which will only be available to deliver the reply through the wireless network, and not via the terminal adaptor 18.

Figure 7:
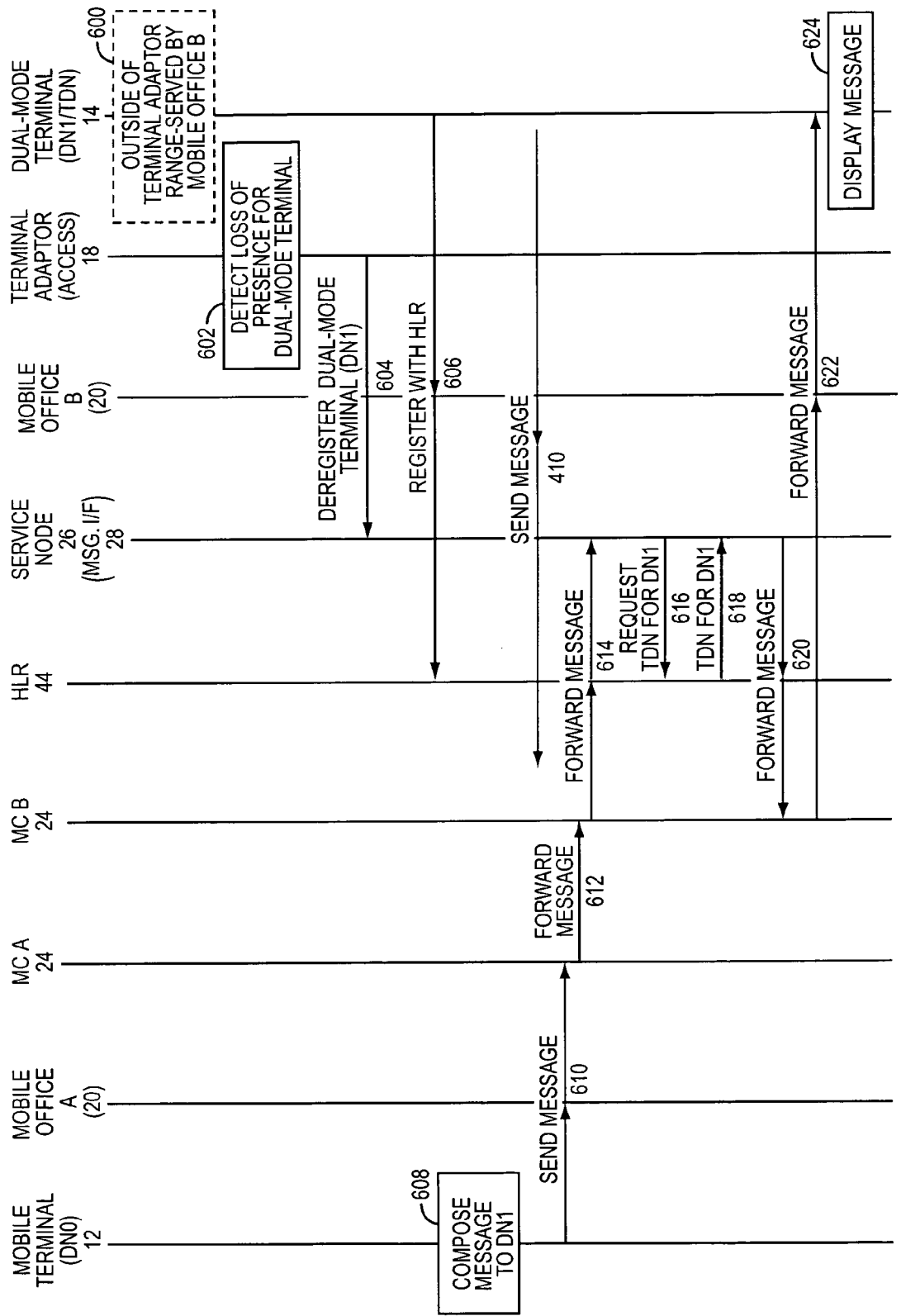

With reference to FIG. 7, an alternative embodiment for delivering a messaging service message from mobile terminal 12 to the dual-mode terminal 14 via the wireless network is shown. In this embodiment, a home location register (HLR) 44 is used to keep track of the dual-mode terminal 14 when it is being serviced by the wireless network, and the service node 26 will be able to access the HLR 44 to obtain a temporary routing number which is used for communications within the wireless core network to reach the mobile office (such as a wireless switching center or communication server) currently serving the dual-mode terminal 14 when it is supported by the wireless network. When the dual-mode terminal 14 is supported by the terminal adaptor 18, it is associated with directory number DN1.

Again, assume that the dual-mode terminal 14 is outside of the terminal adaptor range or is otherwise directed to communicate via the wireless network (step 600). The terminal adaptor 18 may detect a loss of presence for the dual-mode terminal 14 (step 602), and will send a message to the service node 26 to effectively indicate that the terminal adaptor 18 is no longer supporting the dual-mode terminal 14 (step 604). Further, the dual-mode terminal 14 will register with the HLR 44 to indicate that it is being serviced by mobile office 20(B) in traditional fashion (step 606.)

At this point, when the mobile terminal 12 composes a messaging service message intended for directory number DN1 (step 608), the messaging service message is sent to messaging center 24(A) (step 610), which will forward the messaging service message to messaging center 24(B) (step 612). Messaging center 24(B) will then forward the messaging service message to the messaging interface 28 of the service node 26, because the messaging interface 28 appears as the supporting messaging center for directory number DN1 (step 614). The service node 26 will recognize that the dual-mode terminal 14 associated with directory number DN1 is no longer registered in association with the terminal adaptor 18, and will then access the HLR 44 as per existing wireless routing procedures to obtain the temporary routing number associated with the dual-mode terminal 14 having directory number DN1 (step 616). The HLR 44 will obtain a temporary routing number for communicating with mobile office (such as a wireless switching center or communication server) currently serving the dual-mode terminal 14 over the wireless network, and will send the temporary routing number to the service node 26 (step 618). Service node 26 will then replace the directory number DN1 in the messaging service message with the temporary routing number and forward the messaging service message towards the dual-mode terminal 14. In particular, the messaging service message is sent via messaging center 24(B) (step 620), which will route the messaging service message to the dual-mode terminal 14 via mobile office 20(B) (step 622), wherein the dual-mode terminal 14 will display the messaging service message in traditional fashion (step 624).

Figure 8:
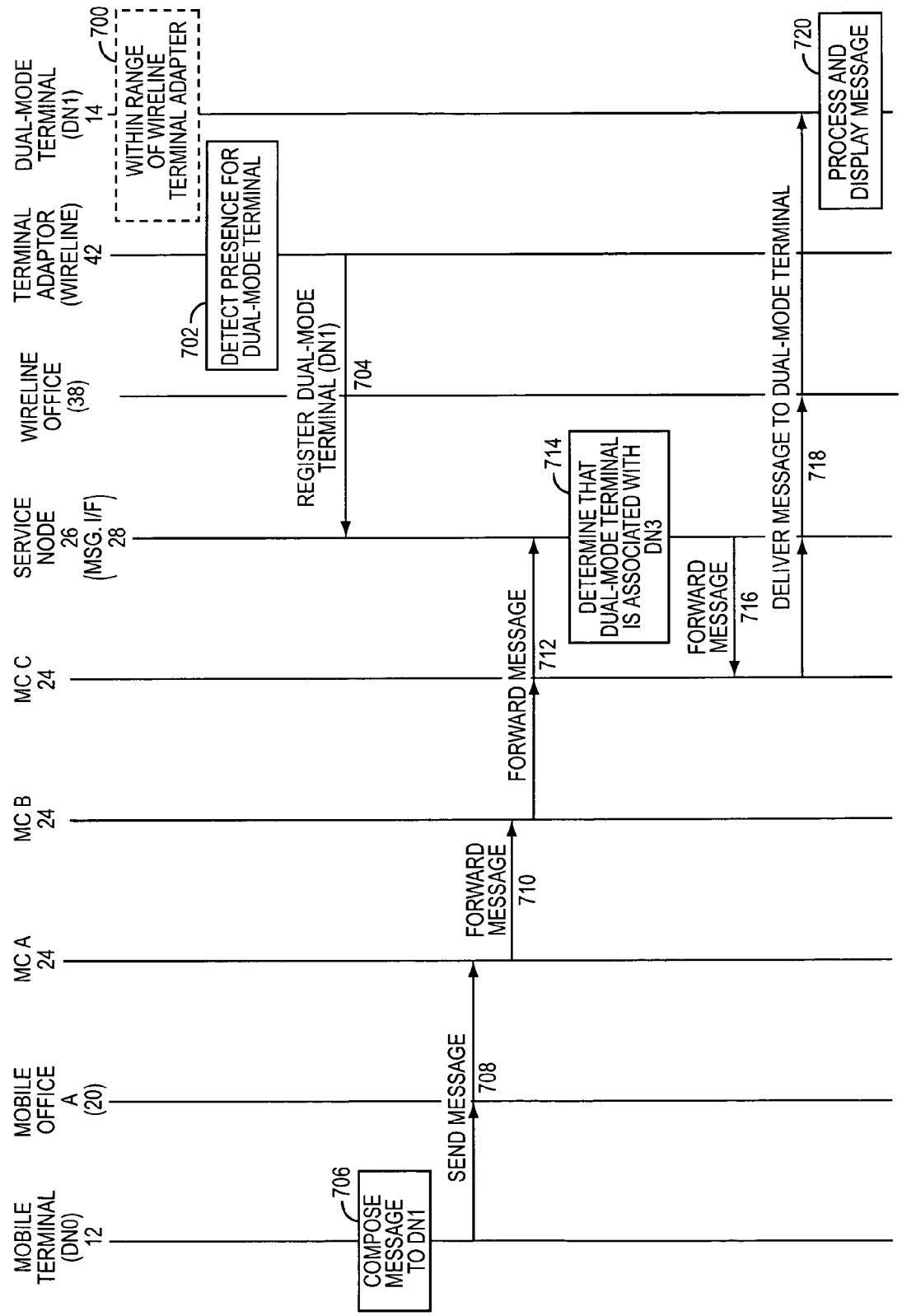

In FIG. 8, the mobile terminal 12 will send a messaging service message to the dual-mode terminal 14 when it is being supported by terminal adaptor 42, which is coupled to the wireline office 38. Initially, the dual-mode terminal 14 will move within communication range of the terminal adaptor 42 (step 700), wherein the terminal adaptor 42 will detect the presence of the dual-mode terminal 14 (step 702) and send a message to the service node 26 to register the dual-mode terminal 14 in association with the terminal adaptor 42 (step 704). Notably, the message sent to the service node 26 from the terminal adaptor 42 may be sent via the wireline office 38 or through a data access network 16 (shown in FIG. 1).

Once the dual-mode terminal 14 is associated with the terminal adaptor 42, assume the mobile terminal 12 composes a messaging service message intended for directory number DN1, which is associated with the dual-mode terminal 14 (step 706). The mobile terminal 12 will then send the messaging service message to messaging center 24(A) via mobile office 20(A) (step 708). Messaging center 24(A) will then forward the messaging service message to messaging center 24(B) (step 710), which will forward the messaging service message to the messaging interface 28 of the service node 26 (step 712) because the messaging interface 28 appears as the messaging center supporting directory number DN1. The service node 26 will receive the messaging service message and determine how to send the messaging service message to the dual-mode terminal 14.

In this example, the service node 26 will determine that the dual-mode terminal 14 is associated with the terminal adaptor 42, which is on a subscriber line associated with directory number DN3 (step 714). The service node 26 via the messaging interface 28 may forward the messaging service message to messaging center 24(C) (step 716), which is capable of cooperating with the wireline office 38 to deliver these messaging service messages over the appropriate subscriber line or other subscriber interface. Thus, messaging center 24(C) will cooperate with the wireline office 38 to deliver the messaging service message to the terminal adaptor 42, which will send the message to the dual-mode terminal 14 over the local wireless interface (step 718). The dual-mode terminal 14 will then process or display the messaging service message as desired (step 720). Messaging center 24(C) will use known mechanisms to deliver the messaging service message via the subscriber line to the terminal adaptor 42 and potentially to the wireline terminal 40 using directory number DN3. One mechanism for providing such delivery requires the terminal adaptor 42 and messaging center 24(C) to include cooperating modems in which the text or data of the messaging service message can be delivered between the messaging center 24(C) and the terminal adaptor 42 using a connection via the wireline office 38. These modems may be similar to or may actually be the modems with which caller identification information can be delivered over the subscriber line or access interface. Alternately, a data access network 16 may couple the terminal adaptor 42 to the packet network 32 to facilitate delivery of the messaging service message.

Figure 9:
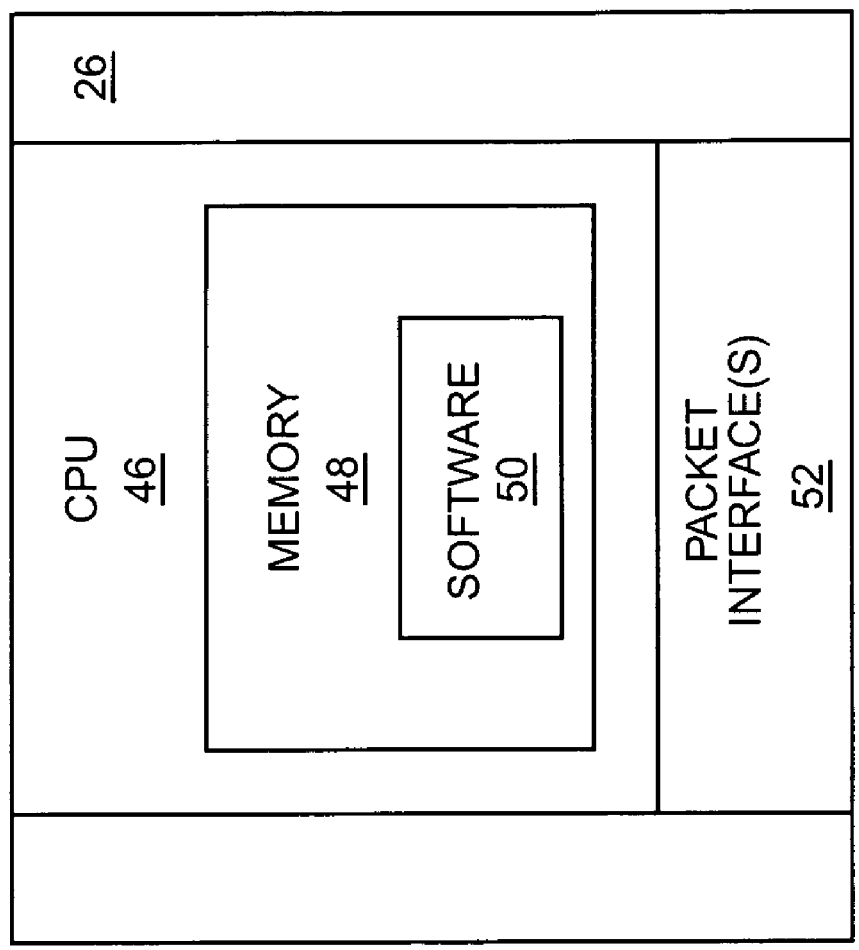
FIG. 9 is a block representation of a service node according to one embodiment of the present invention.

Turning now to FIG. 9, a block diagram of a service node 26 is illustrated. The service node 26 will preferably include a central processing unit (CPU) 46 having sufficient memory 48 to store the software 50 necessary for operation as described above. The CPU 46 is also associated with one or more packet interfaces 52 to facilitate communications with the terminal adaptor 18 (or 42) via the data access network 16, as well as directly or indirectly with the wireline office 38 and mobile offices 20.

Figure 10:
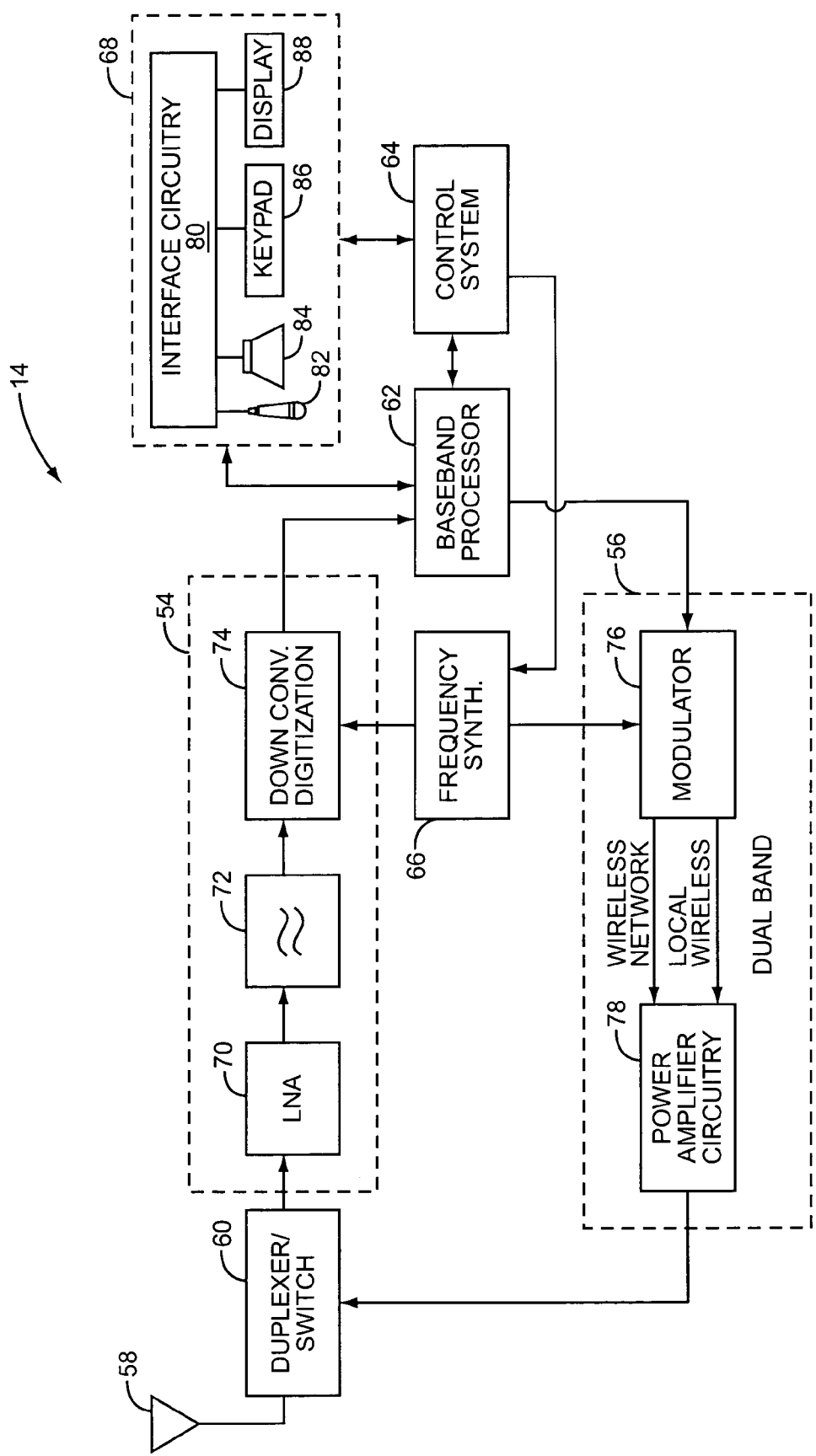
FIG. 10 is a block representation of a mobile terminal according to one embodiment of the present invention.

The basic architecture of the dual-mode terminal 14 is represented in FIG. 10 and may include a receiver front end 54, a radio frequency transmitter section 56, an antenna 58, a duplexer or switch 60, a baseband processor 62, a control system 64, a frequency synthesizer 66, and an interface 68. The receiver front end 54 receives information bearing radio frequency signals from one or more remote transmitters provided by a base station. A low noise amplifier 70 amplifies the signal. A filter circuit 72 minimizes broadband interference in the received signal, while downconversion and digitization circuitry 74 downconverts the filtered, received signal to an intermediate or baseband frequency signal, which is then digitized into one or more digital streams. The receiver front end 54 typically uses one or more mixing frequencies generated by the frequency synthesizer 66. The baseband processor 62 processes the digitized received signal to extract the information or data bits conveyed in the received signal. This processing typically comprises demodulation, decoding, and error correction operations. As such, the baseband processor 62 is generally implemented in one or more digital signal processors (DSPs).

On the transmit side, the baseband processor 62 receives digitized data, which may represent voice, data, or control information, from the control system 64, which it encodes for transmission. The encoded data is output to the transmitter 56, where it is used by a modulator 76 to modulate a carrier signal that is at a desired transmit frequency. Power amplifier circuitry 78 amplifies the modulated carrier signal to a level appropriate for transmission, and delivers the amplified and modulated carrier signal to the antenna 58 through the duplexer or switch 60.

As noted above, the dual-mode terminal 14 must be able to communicate with the terminal adaptor 18 (or 42) as well as with the wireless network. Accordingly, the receiver front end 54, baseband processor 62, and radio frequency transmitter section 56 cooperate to provide either a cellular interface for the wireless network or a local wireless interface for the terminal adaptor 18 (or 42). These functions may be implemented using redundant circuitry, or by configuring common circuitry to operate in different modes. The configuration of the dual-mode terminal 14 will be dictated by economics and designer choice.

A user may interact with the dual-mode terminal 14 via an interface 68, which may include interface circuitry 80 associated with a microphone 82, a speaker 84, a keypad 86, and a display 88. The interface circuitry 80 typically includes analog-to-digital converters, digital-to-analog converters, amplifiers, and the like. Additionally, it may include a voice encoder/decoder, in which case it may communicate directly with the baseband processor 62. The microphone 82 will typically convert audio input, such as the user's voice, into an electrical signal, which is then digitized and passed directly or indirectly to the baseband processor 62. Audio information encoded in the received signal is recovered by the baseband processor 62, and converted by the interface circuitry 80 into an analog signal suitable for driving the speaker 84. The keypad 86 and display 88 enable the user to interact with the mobile terminal 12, input numbers to be dialed, messages, address book information, or the like, as well as monitor call progress information. The control system 64 and interface circuitry 68 will cooperate to provide a messaging service interface capable of sending and receiving messaging service messages as described above. As noted, messaging service messages may be received via a non-messaging service protocol and displayed as a messaging service message. Likewise, messaging service messages may be created in traditional fashion, yet delivered via the local wireless interface instead of via the wireless network.

A dual-mode terminal can comprise a receiver, a transmitter, and a control system operatively associated with the receiver and transmitter. The control system may be adapted to facilitate wireless communications via a wireless network and to facilitate wireless communications though a terminal adaptor. The control system may be also adapted to receive a messaging service message through the terminal adaptor. The control system may be further adapted to send a second messaging service message through the terminal adaptor. The control system may also be further adapted to send the second messaging service message toward a service node, which is capable of routing the second messaging service message to an intended destination. Further, the control system may be adapted to change a destination address of the second messaging service message to an address associated with the service node and insert the destination address in the second messaging service message prior to sending the second messaging service message.

Figure 11:
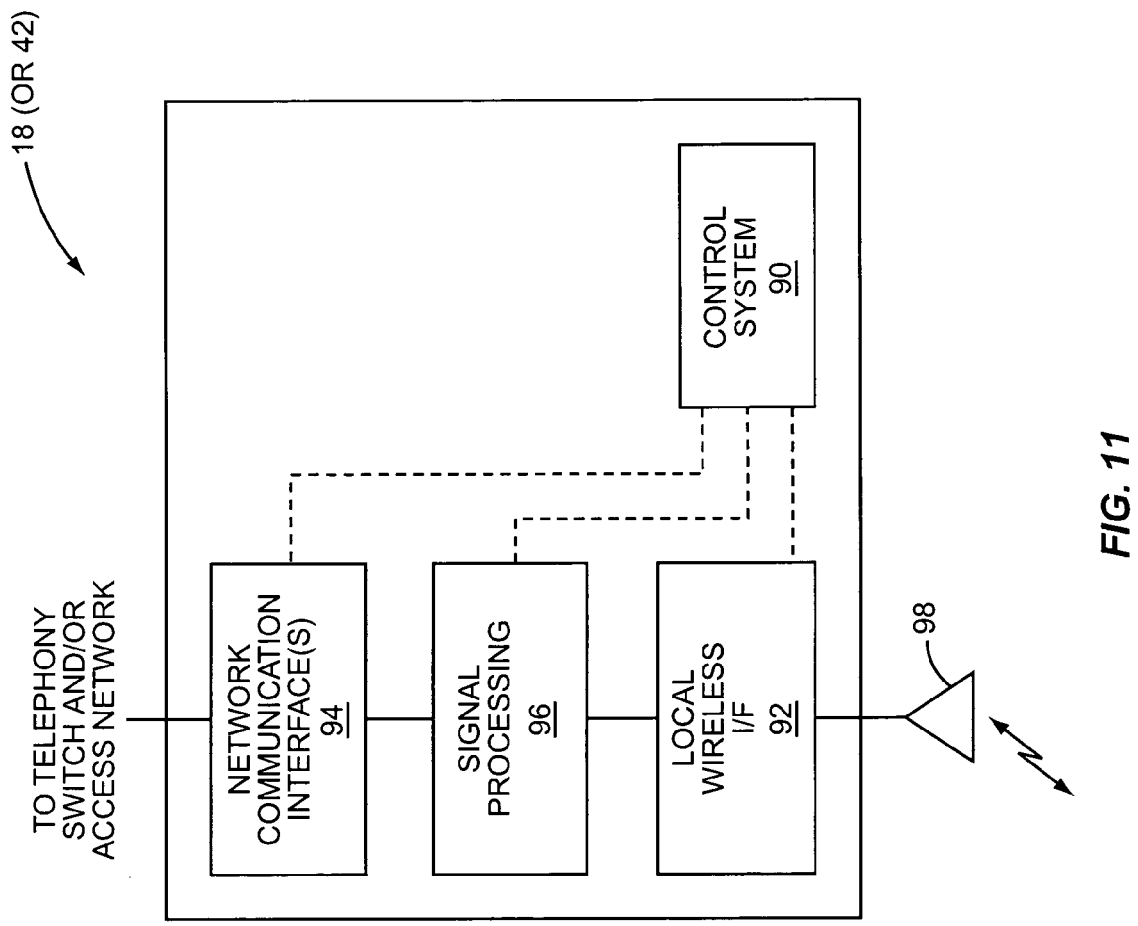
FIG. 11 is a block representation of a terminal adaptor according to one embodiment of the present invention.

A block representation of the terminal adaptor 18 (or 42) is provided in FIG. 11. Preferably, the terminal adaptor 18 (or 42) will include a control system 90 operatively associated with a local wireless interface 92, one or more network communication interface(s) 94 for communicating with the wireline office 38 or data access network 16 via appropriate customer premise equipment, and a signal processing function 96. The signal processing function 96 is part of the control system 90, and is capable of providing all the necessary coding, decoding, and conversions necessary for network communication interface(s) 94 to operate with the local wireless interface 92. The local wireless interface 92 is associated with an antenna 98, and is configured to communicate wirelessly with the dual-mode terminal 14 using any applicable wireless technology, such as traditional analog or digital cordless technology, wireless local area network technology, including 802.11-based technologies, and Bluetooth technology.

The dual-mode terminal 14 must be equipped with a compatible local wireless interface and be configured to cooperate with the terminal adaptor 18 (or 42) to facilitate normal telephone operation. As such, the terminal adaptor 18 (or 42) and the dual-mode terminal 14 must cooperate such that the dual-mode terminal 14 knows when to ring, the terminal adaptor 18 (or 42) knows when the dual-mode terminal 14 has been answered or ends a call, and the dual-mode terminal 14 receives any caller identification or messaging intended for or sent by the user. Further, the local wireless interface 92, alone or in conjunction with the control system 90, may be able to periodically or continuously detect whether the dual-mode terminal 14 is within communication range. Those skilled in the art will recognize numerous techniques for the dual-mode terminal 14 and terminal adaptor 18 (or 42) to cooperate with one another to determine whether or not communications are possible.

Those skilled in the art will also recognize improvements and modifications to the preferred embodiments of the present invention. All such improvements and modifications are considered within the scope of the concepts disclosed herein and the claims that follow.

What is claimed is:

1. A method comprising:
a) receiving, at a messaging service node, a first messaging service message directed to a dual-mode terminal from a messaging center in accordance with a messaging service protocol, wherein the dual-mode terminal is able to facilitate communications via a terminal adaptor which supports local wireless communications including a packet-based session over a data access network or via a cellular-based wireless network;
b) determining, at the messaging service node, whether to send the first messaging service message via the local wireless communications or via the cellular-based wireless network by determining that the dual-mode terminal is operatively coupled to the terminal adaptor;
c) routing, from the messaging service node, the first messaging service message to the dual-mode terminal via the terminal adaptor, when the dual-mode terminal is operatively coupled to the terminal adaptor;
d) receiving, at the messaging service node, a second messaging service message from the dual-mode terminal and changing a destination address of the second messaging service message with the dual-mode terminal to an address associated with the messaging service node and inserting the destination address in the second messaging service message prior to the second messaging service message being sent; and
e) routing the second messaging service message from the messaging service node to an intended destination.

2. The method of claim 1 wherein the first messaging service message is routed over the data access network to the terminal adaptor, which forwards the first messaging service message to the dual-mode terminal.

3. The method of claim 1 wherein the first messaging service message is routed through a wireline office and over a subscriber line to the terminal adaptor, which forwards the first messaging service message to the dual-mode terminal.

4. The method of claim 1 wherein the first messaging service message is routed to the terminal adaptor using a protocol other than that used to receive the first messaging service message.

5. The method of claim 1 further comprising:
a) determining whether to route a third messaging service message to the dual-mode terminal via the terminal adaptor or via the cellular-based wireless network; and
b) routing the third messaging service message to the dual-mode terminal via the cellular-based wireless network when the terminal adaptor is not operatively coupled to the dual-mode terminal, and wherein the third messaging service message is routed to the dual-mode terminal via the terminal adaptor when the terminal adaptor is operatively coupled to the dual-mode terminal.

6. The method of claim 1 wherein the first messaging service message is routed to the terminal adaptor in a session initiation protocol message.

7. The method of claim 1 wherein the first messaging service message is one of the group consisting of a short messaging service message and a multimedia service message.

8. The method of claim 1 further comprising:
a) receiving the second messaging service message from the dual-mode terminal via the terminal adaptor and directed to a device; and
b) routing the second messaging service message to the device.

9. The method of claim 8 wherein the second messaging service message is received as a first type of message and routed to the device as a second type of message.

10. The method of claim 8 further comprising extracting the destination address from the second messaging service message and creating a new second messaging service message to include an origination address associated with the dual-mode terminal while operatively coupled to the terminal adaptor.

11. The method of claim 1 further comprising:
a) receiving the second messaging service message from the dual-mode terminal via the cellular-based wireless network and directed to a device; and
b) routing the second messaging service message to the device.

12. The method of claim 11 further comprising extracting from the second messaging service message the destination address for the device wherein the second messaging service message is routed to the device using the destination address.

13. The method of claim 12 wherein the second messaging service message is routed to the device with an origination address associated with the dual-mode terminal while operatively coupled to the terminal adaptor.

14. A system comprising:
a) at least one communication interface; and
b) a messaging service node associated with the at least one communication interface and adapted to:
i) receive, from a messaging center in accordance with a messaging service protocol, a first messaging service message directed to a dual-mode terminal, wherein the dual-mode terminal is able to facilitate communications via a terminal adaptor which supports local wireless communications including a packet-based session over a data access network or via a cellular-based wireless network;

ii) determine whether to send the first messaging service message via the local wireless communications or via the cellular-based wireless network by determining that the dual-mode terminal is operatively coupled to the terminal adaptor;

iii) route the first messaging service message to the dual-mode terminal via the terminal adaptor, when the dual-mode terminal is operatively coupled to the terminal adaptor;

iv) receive, from the dual-mode terminal, a second messaging service message in which the dual-mode terminal changed a destination address of a device to an address associated with the messaging service node and insert the destination address of the device in the second messaging service message so that the destination address of the device resides in the second messaging service message;

v) extract, from the second messaging service message, the destination address of the device; and vi) route the second messaging service message to the device using the destination address.

15. The system of claim 14 wherein the first messaging service message is routed over a data access network to the terminal adaptor, which forwards the first messaging service message to the dual-mode terminal.

16. The system of claim 14 wherein the first messaging service message is routed through a wireline office and over a subscriber line to the terminal adaptor, which forwards the first messaging service message to the dual-mode terminal.

17. The system of claim 14 wherein the first messaging service message is routed to the terminal adaptor using a protocol other than that used to receive the first messaging service message.

18. The system of claim 14 wherein the messaging service node is further adapted to:
a) receive the second messaging service message from the dual-mode terminal via the cellular-based wireless network and directed to the device; and
b) route the second messaging service message to the device.

19. The system of claim 14 wherein the second messaging service message is routed to the device with an origination address associated with the dual-mode terminal while operatively coupled to the terminal adaptor.

20. The system of claim 14 wherein the messaging service node is further adapted to:
a) determine whether to route a third messaging service message to the dual-mode terminal via the terminal adaptor or via the cellular-based wireless network; and
b) route the third messaging service message to the dual-mode terminal via the cellular-based wireless network when the terminal adaptor is not operatively coupled to the dual-mode terminal, and wherein the third messaging service message is routed to the dual-mode terminal via the terminal adaptor when the terminal adaptor is operatively coupled to the dual-mode terminal.

21. The system of claim 14 wherein the first messaging service message is routed to the terminal adaptor in a session initiation protocol message.

22. The system of claim 14 wherein the first messaging service message is one of the group consisting of a short messaging service message and a multimedia service message.

23. The system of claim 14 wherein the messaging service node is further adapted to:

a) receive the second messaging service message from the dual-mode terminal via the terminal adaptor and directed to the device; and
b) route the second messaging service message to the device.

24. The system of claim 23 wherein the second messaging service message is received as a first type of message and routed to the device as a second type of message.

25. The system of claim 23 wherein the messaging service node is further adapted to create a new second messaging service message to include an origination address associated with the dual-mode terminal while operatively coupled to the terminal adaptor.

26. A dual-mode terminal comprising:
a) a receiver;
b) a transmitter; and
c) a control system operatively associated with the receiver and transmitter and adapted to:
i) facilitate wireless communications via a wireless network;
ii) facilitate wireless communications through a terminal adaptor; and
iii) receive a messaging service message through the terminal adaptor from a messaging service node that received the messaging service message from a messaging center in accordance to a messaging service protocol when a determination is made that the dual-mode terminal is operatively coupled to the terminal adaptor; and
wherein the control system is further adapted to send a second messaging service message toward a service node, which is capable of routing the second messaging service message to an intended destination, and through the terminal adaptor and the control system is further adapted to change a destination address of the second messaging service message to an address associated with the service node and insert the destination address in the second messaging service message prior to sending the second messaging service message.

27. The dual-mode terminal of claim 26 wherein the control system is further adapted to:
a) receive a third messaging service message via the wireless network; and
b) send a fourth messaging service message via the wireless network.

28. The dual-mode terminal of claim 26 further comprising a user interface associated with the control system, which is further adapted to process the messaging service message and provide it to a user of the dual-mode terminal via the user interface.

29. A method comprising:
a) receiving, at a messaging service node, a first messaging service message from a dual-mode terminal via a cellular-based wireless network or a terminal adaptor and directed to a device, the terminal adaptor supporting local wireless communications including a packet-based session over a data access network with the dual-mode terminal;
b) changing a destination address of the device of the first messaging service message with the dual-mode terminal to an address associated with the messaging service node and inserting the destination address of the device in the first messaging service message prior to the first messaging service message being sent to the messaging service node; and c) routing, at the messaging service node, the first messaging service message to the device via a messaging center in accordance to a messaging service protocol.

30. The method of claim 29 further comprising:
   a) receiving a second messaging service message from the dual-mode terminal via the cellular-based wireless network and directed to the device; and
   b) routing the second messaging service message to the device.

31. The method of claim 29 wherein the routing of the first messaging service message further comprising routing the first messaging service message to the device using the destination address of the device.

32. The method of claim 29 further comprising:
   a) receiving a second messaging service message directed to the dual-mode terminal; and
   b) routing the second messaging service message to the dual-mode terminal via the terminal adaptor.

33. The method of claim 29 further comprising:
   a) receiving a second messaging service message directed to the dual-mode terminal; and
   b) routing the second messaging service message to the dual-mode terminal via the cellular-based wireless network.

34. A system comprising:
   a) at least one communication interface; and
   b) a messaging service node associated with the at least one communication interface and adapted to:
      i) receive, from a dual-mode terminal via a terminal adaptor or the cellular-based wireless network, a first messaging service message in which the dual-mode terminal changed a destination address of the first messaging service message associated with a device to an address associated with the messaging service node and insert the destination address associated with the device in the first messaging service message so that the destination address associated with the device resides in the first messaging service message, the terminal adaptor supporting local wireless communications including a packet-based session over a data access network with the dual-mode terminal;
      ii) extract, from the first messaging service message, the destination address associated with the device; and
      iii) route the first messaging service message to the device via a messaging center in accordance to a messaging service protocol.

35. The system of claim 34 wherein the messaging service node is further adapted to:
   a) receive a second messaging service message from the dual-mode terminal via the cellular-based wireless network and directed to the device; and
   b) route the second messaging service message to the device.

36. The system of claim 34 wherein the messaging service node is further adapted to route the first messaging service message to the device using the destination address of the device.

37. The system of claim 34 wherein the messaging service node is further adapted to:
   a) receive a second messaging service message directed to the dual-mode terminal; and
   b) route the second messaging service message to the dual-mode terminal via the terminal adaptor.

38. The system of claim 34 wherein the messaging service node is further adapted to:
   a) receive a second messaging service message directed to the dual-mode terminal; and
   b) route the second messaging service message to the dual-mode terminal via the cellular-based wireless network.

* * * * *